United States Patent [19]

Hsu et al.

[11] Patent Number: 5,797,029
[45] Date of Patent: Aug. 18, 1998

[54] SOUND BOARD EMULATION USING DIGITAL SIGNAL PROCESSOR USING DATA WORD TO DETERMINE WHICH OPERATION TO PERFORM AND WRITING THE RESULT INTO READ COMMUNICATION AREA

[75] Inventors: Mark Hsu, San Jose; Yann Le Cornec, Fremont; Julien T. Nguyen, Redwood City, all of Calif.

[73] Assignee: Sigma Designs, Inc., Fremont, Calif.

[21] Appl. No.: 786,295

[22] Filed: Jan. 22, 1997

Related U.S. Application Data

[63] Continuation of Ser. No. 219,841, Mar. 30, 1994, Pat. No. 5,598,576.

[51] Int. Cl.[6] .................................................. G06F 15/02
[52] U.S. Cl. ............................................................ 395/825
[58] Field of Search ................................. 395/821, 822, 395/825, 2.1, 2.09, 281, 283, 282, 500, 842, 853, 868

[56] References Cited

U.S. PATENT DOCUMENTS

| | | | |
|---|---|---|---|
| 3,846,762 | 11/1974 | Gregory et al. | 340/172.5 |
| 3,908,080 | 9/1975 | Broadbent | 178/6.6 R |
| 3,947,826 | 3/1976 | Bockwoldt | 340/173 |
| 4,353,057 | 10/1982 | Bernet et al. | 340/347 |
| 4,394,650 | 7/1983 | Long et al. | 340/728 |
| 4,425,581 | 1/1984 | Schweppe et al. | 358/148 |
| 4,447,873 | 5/1984 | Price et al. | 395/873 |
| 4,498,098 | 2/1985 | Stell | 358/22 |
| 4,523,227 | 6/1985 | Hurst | 358/105 |
| 4,528,561 | 7/1985 | Kitamura | 340/745 |
| 4,580,165 | 4/1986 | Patton et al. | 358/148 |
| 4,587,633 | 5/1986 | Wang et al. | 364/900 |
| 4,626,837 | 12/1986 | Priestly | 340/723 |
| 4,628,479 | 12/1986 | Borg et al. | 364/900 |
| 4,675,612 | 6/1987 | Adams et al. | 328/63 |
| 4,680,622 | 7/1987 | Barnes et al. | 358/22 |
| 4,684,936 | 8/1987 | Brown et al. | 340/721 |
| 4,713,621 | 12/1987 | Nakamura et al. | 328/55 |
| 4,757,310 | 7/1988 | Katsura et al. | 340/798 |

(List continued on next page.)

FOREIGN PATENT DOCUMENTS

| | | |
|---|---|---|
| 0 384 257 | 8/1990 | European Pat. Off. . |
| 0 384 419 | 8/1990 | European Pat. Off. . |
| 1175374 | 11/1989 | Japan . |

OTHER PUBLICATIONS

Brunhoff, T., "VEX Provides Mechanism for Integrating Graphics and Video"; Computer Technology Review; Nov. 10, 1990, No. 1, pp. 107–111.

*Primary Examiner*—Moustafa A. Meky
*Attorney, Agent, or Firm*—Steven A. Swernofsky

[57] ABSTRACT

An improved audio-output device coupleable to a computer system, in which a DSP operating under software control emulates a common command interface. The command interface has a set of registers that are made available to the CPU for reading and writing, even if there are no such physical registers available in the device. The DSP also performs tasks in addition to audio-output, even though the audio-output device is required to respond immediately to commands from the CPU. The audio-output device has a DSP for interpreting and executing commands received from the CPU, a local memory for storing data input to or output from the DSP, a bus-interface (BIF) element for coupling the DSP and memory to a system bus, and a direct memory access (DMA) element for transferring data between the local memory and the system bus. The local memory has an emulation region for emulating a set of named registers the CPU may read from and write into according to the command interface, and a communication region for transmitting messages between the CPU and the DSP. The emulation region is indicated by a base register and a set of offset values, and has a dynamically allocated set of registers for emulating the set of named registers the CPU may read from and write into.

20 Claims, 3 Drawing Sheets

U.S. PATENT DOCUMENTS

| | | | |
|---|---|---|---|
| 4,779,210 | 10/1988 | Katsura et al. | 364/521 |
| 4,811,205 | 3/1989 | Normington et al. | 364/900 |
| 4,814,879 | 3/1989 | McNeely | 358/148 |
| 4,862,392 | 8/1989 | Steiner | 364/522 |
| 4,870,406 | 9/1989 | Gupta et al. | 340/70 |
| 4,876,600 | 10/1989 | Pietzsch et al. | 358/183 |
| 4,891,631 | 1/1990 | Fredlund et al. | 340/709 |
| 4,905,189 | 2/1990 | Brunolli | 364/900 |
| 4,907,086 | 3/1990 | Truong | 358/183 |
| 4,916,301 | 4/1990 | Mansfield et al. | 340/747 |
| 4,947,257 | 8/1990 | Fernandez et al. | 358/183 |
| 4,947,342 | 8/1990 | Katsura et al. | 364/518 |
| 4,951,229 | 8/1990 | DiNicola et al. | 364/521 |
| 4,953,101 | 8/1990 | Kelleher et al. | 364/518 |
| 4,994,912 | 2/1991 | Lumelsky et al. | 358/140 |
| 5,027,212 | 6/1991 | Marlton et al. | 358/183 |
| 5,046,023 | 9/1991 | Katsura et al. | 364/518 |
| 5,065,346 | 11/1991 | Kawai et al. | 395/128 |
| 5,097,257 | 3/1992 | Clough et al. | 340/814 |
| 5,099,331 | 3/1992 | Truong | 358/183 |
| 5,111,292 | 5/1992 | Kuriacose et al. | 358/133 |
| 5,111,409 | 5/1992 | Gasper et al. | 395/152 |
| 5,122,875 | 6/1992 | Raychaudhuri et al. | 358/133 |
| 5,138,307 | 8/1992 | Tatsumi | 340/721 |
| 5,151,875 | 9/1992 | Sato | 364/784 |
| 5,157,716 | 10/1992 | Naddor et al. | 379/92 |
| 5,168,356 | 12/1992 | Acampora et al. | 358/133 |
| 5,185,665 | 2/1993 | Okura et al. | 358/183 |
| 5,191,410 | 3/1993 | McCalley et al. | 358/86 |
| 5,191,548 | 3/1993 | Balkanski et al. | 364/725 |
| 5,196,946 | 3/1993 | Balkanski et al. | 358/433 |
| 5,208,745 | 5/1993 | Quentin et al. | 364/188 |
| 5,218,431 | 6/1993 | Gleicher et al. | 358/13 |
| 5,218,710 | 6/1993 | Yamaki et al. | 704/201 |
| 5,220,312 | 6/1993 | Lumelsky et al. | 340/721 |
| 5,231,492 | 7/1993 | Dangi et al. | 358/143 |
| 5,243,447 | 9/1993 | Bodenkamp et al. | 345/133 |
| 5,253,078 | 10/1993 | Balkanski et al. | 358/426 |
| 5,270,832 | 12/1993 | Balkanski et al. | 358/432 |
| 5,276,864 | 1/1994 | Hernandez et al. | 395/182.08 |
| 5,289,276 | 2/1994 | Siracusa et al. | 348/467 |
| 5,291,614 | 3/1994 | Baker et al. | 395/800.35 |
| 5,297,231 | 3/1994 | Miller | 704/201 |
| 5,309,111 | 5/1994 | McNeely et al. | 328/113 |
| 5,309,567 | 5/1994 | Mizukami | 395/325 |
| 5,329,630 | 7/1994 | Baldwin | 395/425 |
| 5,333,261 | 7/1994 | Guttag et al. | 395/162 |
| 5,341,318 | 8/1994 | Balkanski et al. | 364/725 |
| 5,371,861 | 12/1994 | Keener et al. | 395/325 |
| 5,379,356 | 1/1995 | Purcell et al. | 382/56 |
| 5,392,239 | 2/1995 | Margulis et al. | 365/189.01 |
| 5,397,853 | 3/1995 | Koguchi | 84/609 |
| 5,402,147 | 3/1995 | Chen et al. | 345/115 |
| 5,406,306 | 4/1995 | Siann et al. | 345/115 |
| 5,416,749 | 5/1995 | Lai | 365/240 |
| 5,426,756 | 6/1995 | Shyi et al. | 395/425 |
| 5,434,913 | 7/1995 | Tung et al. | 379/202 |
| 5,446,501 | 8/1995 | Takemoto et al. | 348/620 |
| 5,450,542 | 9/1995 | Lehman et al. | 395/162 |
| 5,450,544 | 9/1995 | Dixon et al. | 395/164 |
| 5,471,576 | 11/1995 | Yee | 395/154 |
| 5,513,374 | 4/1996 | Baji | 395/846 |
| 5,598,576 | 1/1997 | Hsu et al. | 395/822 |
| 5,638,530 | 6/1997 | Pawate et al. | 395/282 |

SOUND BOARD EMULATION USING DIGITAL SIGNAL PROCESSOR USING DATA WORD TO DETERMINE WHICH OPERATION TO PERFORM AND WRITING THE RESULT INTO READ COMMUNICATION AREA

CROSS-REFERENCE TO RELATED APPLICATION

This is a continuation of patent application Ser. No. 08/219,841, filed Mar. 30, 1994, now U.S. Pat. No. 5,598,576.

BACKGROUND OF THE INVENTION

1. Field of the Invention

This invention relates to sound board emulation using a digital signal processor.

2. Description of Related Art

There has been a great deal of market demand for audio and video output from computer systems, particularly in the case of personal computer systems known as "PC"s. This has led to the availability of hardware devices for producing audio output in response to commands from a central processing unit (CPU). Such a device may be commonly integrated into a computer system by implementing it on an add-in board, and by coupling the add-in board to a system bus, such as the industry-standard architecture (ISA) or extended ISA (EISA) bus. When coupled to the system bus, the board may be commanded by the CPU, under control of software for producing and playing audio output.

One product for producing audio output is the "Sound Blaster" product, available from Creative Technology, Inc., of Milpitas, Calif. This product, and the interface by which the CPU may command it, has become popular with some segments of the personal computer industry, and its command interface is also commonly used by other devices.

It is desirable for makers of audio-output boards to have the same command interface. Makers of hardware and software for personal computer systems may rely, and will certainly prefer, that any audio-output board have the same command interface. Designer may also wish to avoid multiple versions of a product (designed for compatibility with more than one product's command interface), and may therefore provide a product which uses only one command interface.

One aspect of this common command interface is that it specifies certain named registers that the CPU may access on the audio-output board, either to read values from or to write values into. While this may be an acceptable way for the CPU to command the audio-output board, it is desirable that an audio-output board does not require actual physical registers to implement this aspect of the command interface. For example, an implementation in which these registers are simulated by other physical means may be less expensive, faster, or more easily upgraded.

It is also desirable that an audio-output board does not require an implementation using dedicated hardware for the functions it provides, and may instead be implemented using a digital signal processor (DSP) operating under software control. However, the common command interface described above generally requires that the audio-output board must be immediately responsive to commands from the CPU. This generally requires that the DSP must spend its time watching and waiting for, and responding to, the CPU, and that its additional computing power is therefore wasted.

Accordingly, it is an object of this invention to provide an improved audio-output device.

SUMMARY OF THE INVENTION

The invention provides an improved audio-output device that may be coupled to a computer system, in which a DSP operating under software control may emulate a common command interface. The command interface may comprise a set of registers that are made available to the CPU for reading and writing, even if there are no such physical registers available in the device. The DSP may also perform tasks in addition to audio-output, even though the audio-output device may be required to respond immediately to commands from the CPU.

In a preferred embodiment, the audio-output device may comprise a DSP for interpreting and executing commands received from the CPU, a local memory for storing data input to or output from the DSP, a bus-interface (BIF) element for coupling the DSP and memory to a system bus, and a direct memory access (DMA) element for transferring data between the local memory and the system bus. The local memory may comprise an emulation region for emulating a set of named registers the CPU may read from and write into according to the command interface, and a communication region for transmitting messages between the CPU and the DSP.

In a preferred embodiment, the emulation region may be indicated by a base register and a set of offset values, and may comprise a dynamically allocated set of registers for emulating the set of named registers the CPU may read from and write into. The communication region may comprise a set of registers for the BIF to indicate that a message has been received from the CPU for the DSP or is available for the CPU from the DSP. The local memory may also comprise a DMA transfer buffer for transferring data between the local memory and another memory coupled to the system bus.

DESCRIPTION OF THE PREFERRED EMBODIMENT

The invention may be understood in conjunction with a specification for the "Sound Blaster" device command interface, available from Creative Technology, Inc., as a document titled "The Developer Kit for Sound Blaster Series—User's Guide", hereby incorporated by reference as if fully set forth herein. However, those skilled in the art would recognize, after perusal of this application, that other command interfaces would be workable, and are within the scope and spirit of the invention.

SYSTEM INCLUDING EMULATION BOARD

Figure 1:
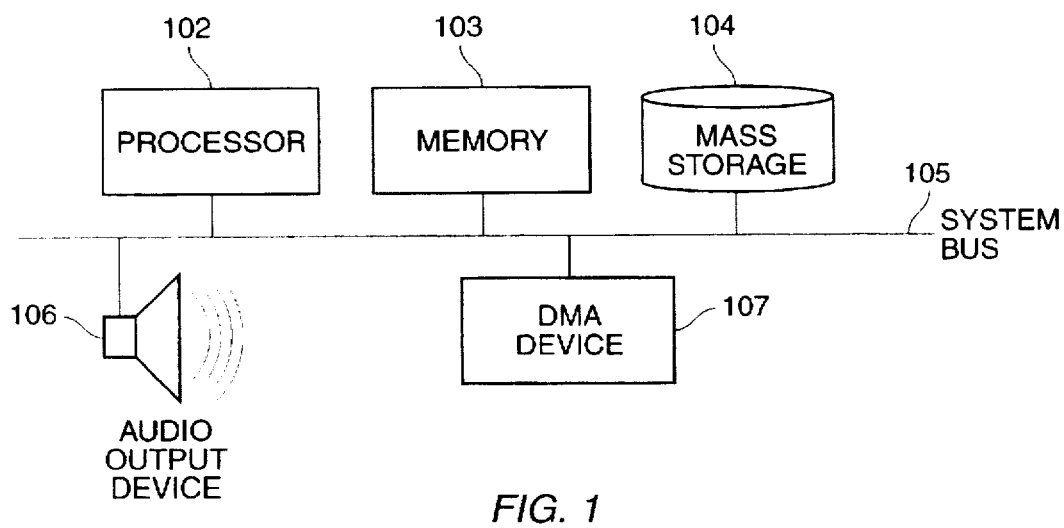
FIG. 1 shows a block diagram of a computer system including an emulation board.

FIG. 1 shows a block diagram of a computer system including an emulation board.

A computer system 101 may comprise a processor 102, memory 103, and mass storage 104, all coupled to a system bus 105. For example, in a preferred embodiment, the computer system 101 may comprise an IBM compatible PC, having an Intel 386 processor operating at 25 MHz or better, with at least 2 MB of RAM and at least 2 MB of space free on a magnetic disk drive mass storage unit, and having an ISA or EISA bus. Such systems are known in the art.

Those skilled in the art would readily understand, after perusal of this application, that the methods and techniques described for operation on a processor or computer system would be readily implemented on such a digital computer system without undue experimentation. Accordingly, detailed description of computer programming techniques or methods of implementation are not set forth herein, except where such techniques or methods are specific to the invention.

In a preferred embodiment, an audio-output device 106 may be implemented using an add-in board, such as a printed circuit board having a set of semiconductor circuits integrated onto a set of semiconductor "chips", with such chips coupled to each other or to a power source using printed circuits or other known wiring techniques. Such add-in boards are known in the art; indeed, many computer systems manufactured today include a plurality of receiving slots for coupling such add-in boards to the computer system and to the computer system bus.

In a preferred embodiment, the audio-output device 106 may be coupled to the system bus 105 using known methods for coupling an add-in board to a system bus, such as the ISA or EISA specification for a device to bus coupling. The processor 102 may communicate with the audio-output device 106 by means of the bus 105; communication techniques therefor are known in the art. Alternatively, the processor 102 may communicate with the audio-output device 106 by means of reading from and writing to the memory 103; this is described in further detail herein.

In a preferred embodiment, when a software program, stored in memory 103 or in mass storage 104 and controlling the processor 102, desires to use the capabilities of the audio-output device 106, it may cause the processor 102 to generate a command to the audio-output device 106 in a format required by the command interface. In a preferred embodiment, the command interface may follow the common command interface disclosed herein by reference. The audio-output device 106 may respond to the command, such as by generating a designated sound sequence or by altering its (virtual) internal state, again as prescribed by the common command interface disclosed herein by reference.

EMULATION BOARD USING DIGITAL SIGNAL PROCESSOR

Figure 2:
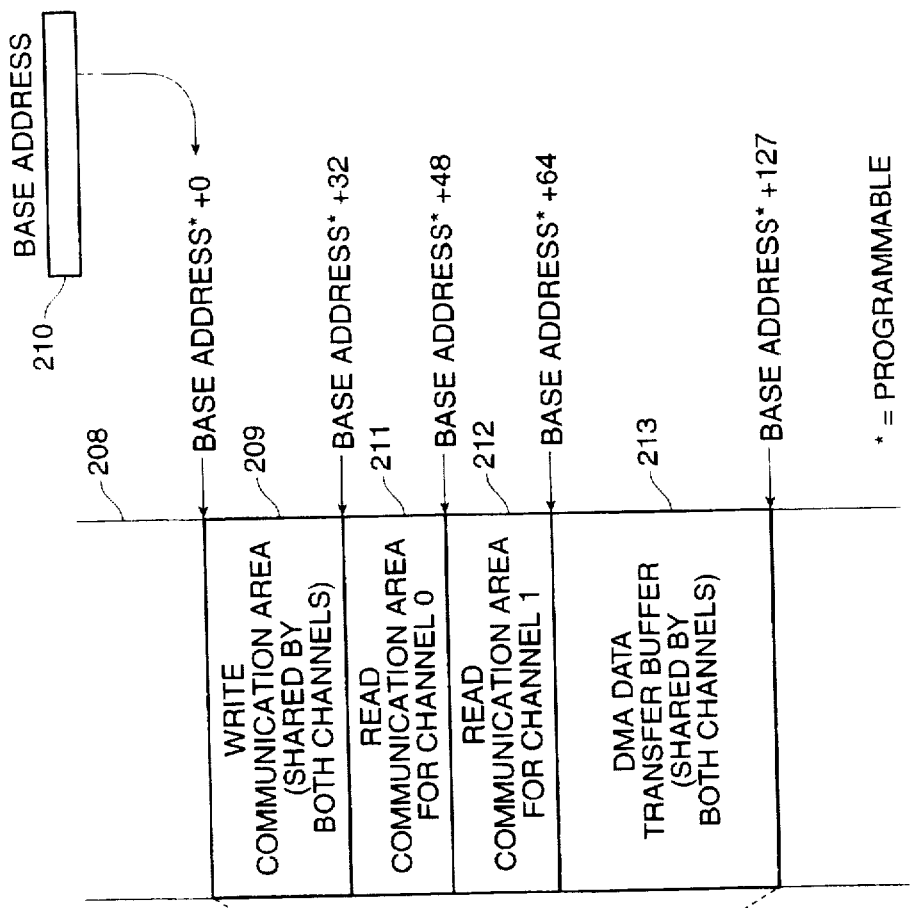
FIG. 2 shows a block diagram of an emulation board using a digital signal processor.
Figure 2:
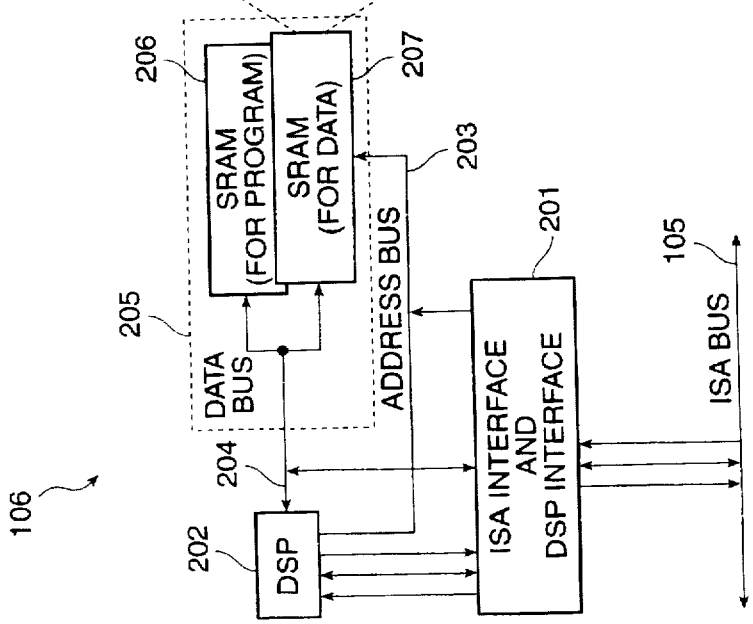

FIG. 2 shows a block diagram of an emulation board using a digital signal processor.

An audio-output device 106 may comprise a bus interface (BIF) element 201 coupled to the system bus 105, a digital signal processor (DSP) 202 coupled to the bus interface element 201, an internal address bus 203 coupled to the bus interface element 201 and to the DSP 202, an internal data bus 204, and an internal memory 205 coupled to the address bus 203. In a preferred embodiment, the internal memory 205 may comprise an internal program memory 206 and an internal data memory 207.

In a preferred embodiment, the internal memory 205 may comprise static random access memory (SRAM). However, those skilled in the art would recognize, after perusal of this application, that other types of memory would be workable, and are within the scope and spirit of the invention. Such other types of memory could comprise, for example, read only memory (ROM) or nonvolatile memory (NOVRAM) for the internal program memory 206, and could comprise, for example, dynamic RAM (DRAM) or video RAM (VRAM) for the internal data memory 207. A cache could also be coupled to the internal memory 205 (or to just the internal program memory 206 or the internal data memory 207), although in a preferred embodiment, a cache is not considered necessary.

The internal data memory 207 may comprise a set of addressable registers 208, so that when an address is presented to the internal memory 205 on the internal address bus 203, the internal data memory 207 may refer to one of the addressable registers 208, i.e., to read from or write into the named addressable register 208. In a preferred embodiment, the addressable registers 208 may comprise 16 bits each.

A subset of the internal data memory 207 may comprise a write communication area 209. The write communication area 209 may be designated by a base address register 210 (comprising a base address) for indicating a minimum address and an offset for indicating a maximum offset from the minimum address, both in the set of addressable registers 208 in the internal data memory 207. In a preferred embodiment, the minimum address and maximum offset are set so that 32 addressable registers 208 from <base address+0> to <base address+31> may comprise the write communication area 209.

Similarly, a subset of the internal data memory 207 may comprise a zeroth and a first read communication area 211 and 212 respectively. The zeroth and the first read communication areas 211 and 212 may each be designated by the base address register 210 for indicating a minimum address and an offset for indicating a maximum offset from the minimum address. In a preferred embodiment, the minimum address and maximum offset are set so that 16 addressable registers 208 from <base address+32> to <base address +47> may comprise the zeroth read communication area 211, and 16 addressable registers 208 from <base address+48> to <base address+63> may comprise the first read communication area 212.

Similarly, a subset of the internal data memory 207 may comprise a DMA data transfer buffer 213. The DMA data transfer buffer 213 may be designated by the base address register 210 for indicating a minimum address and an offset for indicating a maximum offset from the minimum address. In a preferred embodiment, the minimum address and maximum offset are set so that 64 addressable registers 208 from <base address+64> to <base address +127> may comprise the DMA data transfer buffer 213.

In a preferred embodiment a single base address register 210 is used to indicate a minimum address for the write communication area 209, for the zeroth and first read communication areas 211 and 212, and for the DMA data transfer buffer 213. However, it would be clear to those skilled in the art after perusal of this application that a plurality of base address registers 210 could be used as well, and that this is within the scope and spirit of the invention.

OPERATION OF THE EMULATION BOARD

In a preferred embodiment, the BIF 201 may receive a command from the processor 102 by means of the system bus 105. Communication by means of a system bus is known in the art. The BIF 201 may then decode the command to determine whether (1) data should be written into the internal data memory 207, (2) data should be read from the internal data memory 207 and presented to the processor 102. (3) the DSP 202 should be interrupted. In a preferred embodiment, a command from the processor 102 may require one or more of these actions.

In case (1), data should be written into the internal data memory 207, the BIF 201 may determine whether the data is available from the command itself. For example, the command may instruct the audio-output device 106 to put a designated value into a designated register, and may designate that value in the body of the command itself. If so, the BIF 201 maps the designated register into an addressable register 208 in the write communication area 209, and writes the data from the command directly into the mapped addressable register 208.

Alternatively, the BIF 201 may determine that the data is not available from the command, and must be retrieved from the system memory 103. For example, the command may instruct the audio-output device 106 to move data from the system memory 103 into a designated register. If so, the BIF 201 causes a DMA device 107 (FIG. 1) to read the data from the system memory 103 by means of the system bus 105 and to write the data into the DMA data transfer buffer 213 by means of the internal data bus 204. The DMA device 107 may signal the BIF 201 when the data transfer is complete, whereupon the BIF 201 may proceed as in the case where the data was available from the command itself.

In case (2), data should be read from the internal data memory 207, the BIF 201 may determine which addressable register 208 in the internal data memory 207 is to be read from. Generally, the command may designate a particular register for the audio-output device 106. The BIF 201 may map the designated register is into a designated addressable register 208 in the zeroth or first read communication areas 211 or 212. The BIF 201 may read the data from the mapped designated addressable register 208 and may transfer the data to the processor 102 by means of the system bus 105.

In case (3), the DSP 202 should be interrupted, the BIF 201 may write information about the command into a designated addressable register 208 in the write communication area 209 and may signal the DSP 202 that an operation should be performed. The BIF 201 may indicate what operation is specified by the command, and what data is to be operated upon. In a preferred embodiment, the BIF 201 may signal the DSP 202 by setting a bit in a designated addressable register 208 in the write communication area 209 for the DSP 202 to see.

The DSP 202 may respond to the interrupt by reading the designated addressable register 208 in the write communication area 209, performing the designated operation, and writing the answers into a designated addressable register 208 in the zeroth or first read communication area 211 or 212. The DSP 202 may then signal the BIF 201 that the operation is complete. In a preferred embodiment, the DSP may signal the BIF 201 by setting a bit in a designated addressable register 208 in the zeroth or first read communication area 211 or 212 for the BIF 201 to see.

The zeroth and first read communication areas 211 and 212 may be used so the BIF 201 may read data for presentation to the processor 102 at the same time the DSP 202 is performing an operation and writing output data, also for presentation to the processor 102. However, it will be clear to those skilled in the art that other methods of parallel operation by the BIF 201 and the DSP 202, and other methods of synchronization of the two, would be workable, and are within the scope and spirit of the invention.

BIF/DSP COMMUNICATION DATA FORMAT

Figure 3:
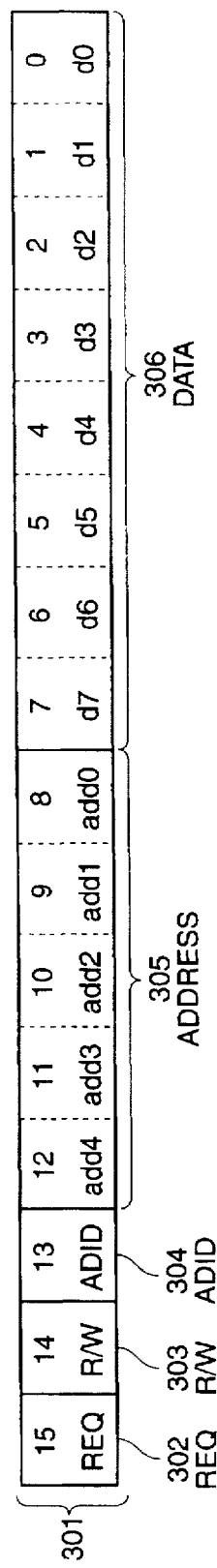
FIG. 3 shows a block diagram of a data word for communication between the BIF 201 and the DSP 202.

FIG. 3 shows a block diagram of a data word for communication between the BIF 201 and the DSP 202.

In a preferred embodiment, the BIF 201 may comprise the Piccolo product, available from Sigma Designs Corporation of Fremont, Calif., and the DSP 202 may comprise an AD2105 chip, available from Analog Devices of Norwood, Mass. However, those skilled in the art would recognize, after perusal of this application, that other implementations of the BIF 201 or the DSP 202 would be workable, and are within the scope and spirit of the invention. For example, the BIF 201 may comprise any processor device having the functions specified herein, and may therefore comprise a processor chip, an ASIC, an FPGA, or other suitable hardware. For example, the DSP 202 may comprise any processor device having the functions specified herein, and may therefore comprise a processor chip, an ASIC, an FPGA, or other suitable hardware. The BIF 201 and DSP 202 may even be combined into a single device, so long as two streams of executioin may operate separately to perform the two sets of functions specified herein.

A data word 301 for communication between the BIF 201 and the DSP 202 may be held in an addressable register 208 in the internal data memory 207. In a preferred embodiment, this addressable register 208 may be located in the write communicaiton area 209. The data word 301 may comprise a REQ bit 302 for indicating whether a command has been received from the processor 102, a R/W bit 303 for indicating whether the command is a read command or a write command, an ADID field 304 for indicating which one of a plurality of audio-output registers are to be emulated, an address field 305 for indicating which one of a plurality of emulated registers is designated by the command, and a data field 306 for indicating data communicated by the command.

In a preferred embodiment, two sets of audio-output registers may be emulated, to emulate two separate channels of operation for the audio-output device 106.

In a preferred embodiment, the BIF 201 may set the REQ bit 302 to indicate that the data field 306 comprises valid data. The DSP 202 may clear the REQ bit 302 to indicate that it has read or processed that data, and by implication, that the BIF 201 may overwrite the data field 306.

In a preferred embodiment, the BIF 201 may set the R/W bit 303 to indicate that a write command has been designated by the processor 102, or may clear the R/W bit 303 to indicate that a read command has been designated.

In a preferred embodiment, the BIF 201 may set the ADID field 304 to indicate which one of a plurality of audio-output registers are to be emulated. In a preferred embodiment, the ADID field 304 may comprise a single bit, and there may be two sets of audio-output registers to be emulated.

In a preferred embodiment, the BIF 201 may set the address field 305 to indicate which one of a plurality of emulated registers is designated by the command. In a preferred embodiment, the address field 305 may comprise five bits and there may be a set of 32 emulated registers in each set.

In a preferred embodiment, the BIF 201 may set the data field 306 to indicate data communicated by the command, and the DSP 202 may read the data field 306 as part of processing the command. In a preferred embodiment, the data field 306 may comprise eight bits.

Alternative Embodiments

While preferred embodiments are disclosed herein, many variations are possible which remain within the concept and scope of the invention, and these variations would become clear to one of ordinary skill in the art after perusal of the specification, drawings and claims herein.

We claim:

1. A method for emulating a sound board, the method comprising the steps of:

receiving a command from a device;

performing a write operation into an addressable space within a write communication area when said command indicates that data should be written into a designated register, said step of performing a write operation further including a step of mapping said designated register to said addressable space within said write communication area;

performing a read operation from an addressable space within a read communication area when said command indicates that data should be read from a designated register, said step of performing a read operation further including a step of mapping said designated register to said addressable space within said read communication area; and writing a data word which contains information corresponding to said command into an addressable space within said write communication area and signaling a digital signal processor when said command indicates that said digital signal processor should be interrupted, said digital signal processor responsive to said signal by using said data word to determine which operation to perform, said digital signal processor writing a result of said operation into an addressable space within said read communication area.

2. The method of claim 1, wherein said step of performing a write operation further includes obtaining said data from said command.

3. The method of claim 1, wherein said step of performing a write operation further includes obtaining said data from a system memory.

4. The method of claim 1, further including a step of presenting data to said device by presenting data from said read communication area.

5. The method of claim 1, further including a step of synchronizing the presentation of data to said device from more than one source by providing a zeroth read area and a first read area within said read communication area, said zeroth read area for presenting data to said device from a first stream of execution, and said first read area for presenting data to said device from a second stream of execution.

6. The method of claim 5, wherein said second stream of execution is provided by said digital signal processor.

7. The method of claim 1, further including the steps of:

forming a zeroth read area and a first read area within said read communication area; and presenting data to a device by presenting data from said zeroth read communication area, while said digital signal processor is also presenting data to said device from said first read communication area.

8. The method of claim 1, further including the steps of:

forming a zeroth read area and a first read area within said read communication area; and presenting data to a device by presenting data from said first read communication area, while said digital signal processor is also presenting data to said device from said zeroth read communication area.

9. The method of claim 1, wherein said command complies with a common device command interface standard.

10. The method of claim 9, wherein said common device command interface complies with the Sound Blaster device command interface.

11. The method of claim 1, wherein said data word includes a request field, a read/write field, a channel field, an address field, and a data field.

12. The method of claim 11, further including a step of setting a bit within said request field to indicate that said data field contains valid data.

13. The method of claim 11, further including a step of clearing a bit within said request field to indicate that it has read or processed data with said data field.

14. The method of claim 11, further including a step of setting a bit within said read/write field to indicate a write command.

15. The method of claim 11, further including a step of clearing a bit within said read/write field to indicate a read command.

16. The method of claim 11, further including a step of setting a bit within said channel field to indicate which one of said zeroth or first read areas are to be used to emulate a plurality of audio-output registers.

17. The method of claim 11, further including a step of setting a bit value within said address field to indicate which one of a plurality of addressable registers are to be mapped.

18. The method of claim 1, further including a step of presenting data within said read communication area to said device.

19. The method of claim 1, further including the steps of:

providing an internal memory store and DMA device;

coupling a system bus to said DMA device; and coupling an external memory store to said system bus.

20. A method for emulating a sound board, the method comprising the steps of:

receiving a command from a device;

performing a write operation into an addressable space within a write communication area when said command indicates that data should be written into a designated register, said step of performing a write operation further including a step of mapping said designated register with said space within said write communication area;

performing a read operation from an addressable space within a read communication area when said command indicates that data should be read from a designated register, said step of performing a read operation further including a step of mapping said designated register with said space within said read communication area;

writing a data word which contains information corresponding to said command into an addressable space within said write communication area and signaling a digital signal processor when said command indicates that said digital signal processor should be interrupted, said digital signal processor responsive to said signal by using said data word to determine which operation to perform, said digital signal processor writing a result of said operation into an addressable space within said read communication area;

synchronizing the presentation of data to said device from more than one source by providing a zeroth read area and a first read area within said read communication area, said zeroth read area for presenting data to said device from a first stream of execution, and said first read area for presenting data to said device from a second stream of execution.

* * * * *